United States Patent
Lee et al.

(10) Patent No.: US 8,787,719 B2
(45) Date of Patent: Jul. 22, 2014

(54) BEND INSENSITIVE FIBER

(71) Applicants: Yeong-Seop Lee, Gumi-si (KR); Mun-Hyun Do, Daegu (KR); Si-Ho Song, Gumi-si (KR); Myung-Hwan Pyo, Gumi-si (KR); Dae-Hwan Oh, Gumi-si (KR); Won-Sun Lee, Gumi-si (KR); Dae-Seung Moon, Gumi-si (KR); Tae-Hyung Lee, Gumi-si (KR); Tae-Hun Kim, Gumi-si (KR)

(72) Inventors: Yeong-Seop Lee, Gumi-si (KR); Mun-Hyun Do, Daegu (KR); Si-Ho Song, Gumi-si (KR); Myung-Hwan Pyo, Gumi-si (KR); Dae-Hwan Oh, Gumi-si (KR); Won-Sun Lee, Gumi-si (KR); Dae-Seung Moon, Gumi-si (KR); Tae-Hyung Lee, Gumi-si (KR); Tae-Hun Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 13/652,656

(22) Filed: Oct. 16, 2012

(65) Prior Publication Data

US 2013/0094824 A1    Apr. 18, 2013

(30) Foreign Application Priority Data

Oct. 17, 2011    (KR) .................. 10-2011-0105904

(51) Int. Cl.
   *G02B 6/02*    (2006.01)
(52) U.S. Cl.
   USPC ............ 385/124; 385/123; 385/126; 385/127
(58) Field of Classification Search
   USPC .......................................... 385/124
   See application file for complete search history.

(56) References Cited

U.S. PATENT DOCUMENTS

| | | |
|---|---|---|
| 4,852,968 A | 8/1989 | Reed |
| 7,450,807 B2 | 11/2008 | Bickham et al. |
| 8,081,854 B2 | 12/2011 | Yoon et al. |
| 2006/0115224 A1 | 6/2006 | Kutami et al. |
| 2006/0137398 A1 | 6/2006 | Bleaking et al. |
| 2007/0147751 A1 | 6/2007 | Fini |
| 2008/0013901 A1 | 1/2008 | Kim et al. |
| 2009/0041415 A1 | 2/2009 | Tanobe et al. |
| 2009/0252469 A1 | 10/2009 | Sillard et al. |
| 2009/0290841 A1 | 11/2009 | Borel et al. |
| 2010/0158460 A1* | 6/2010 | Yoon et al. ............... 385/124 |
| 2011/0044596 A1* | 2/2011 | Zhang et al. ............. 385/124 |

(Continued)

FOREIGN PATENT DOCUMENTS

| | | |
|---|---|---|
| CN | 101097273 A | 1/2008 |
| CN | 101770051 A | 7/2010 |

(Continued)

OTHER PUBLICATIONS

Korean Office Action issued on Sep. 24, 2012 in counterpart Korean Application No. 10-2011-0105904 (4 pages, in Korean).

(Continued)

*Primary Examiner* — Ryan Lepisto
(74) *Attorney, Agent, or Firm* — NSIP Law

(57) ABSTRACT

Provided is an extreme bending insensitive optical fiber. The optical fiber includes a core comprising a maximum refractive index difference $\Delta n1$ in the optical fiber, an inner layer comprising a refractive index difference $\Delta n2$ that is smaller than the maximum refractive index of the core and decreases in a direction away from the core, the inner layer being positioned outside the core, and a trench layer comprising an inner-circumference refractive index difference $\Delta n3$ that is smaller than the refractive index difference of the inner layer and an outer-circumference refractive index difference $\Delta n4$ that is a minimum refractive index difference in the optical fiber.

12 Claims, 5 Drawing Sheets

(56) References Cited

U.S. PATENT DOCUMENTS

| | | | |
|---|---|---|---|
| 2011/0194814 A1 | 8/2011 | Fini et al. | |
| 2012/0057834 A1* | 3/2012 | Oyamada et al. | 385/127 |
| 2012/0183268 A1 | 7/2012 | De Montmorillon et al. | |
| 2012/0321891 A1 | 12/2012 | Nunome | |
| 2013/0136405 A1* | 5/2013 | Bookbinder et al. | 385/124 |

FOREIGN PATENT DOCUMENTS

| | | |
|---|---|---|
| CN | 102043195 A | 5/2011 |
| CN | 102156323 A | 8/2011 |
| EP | 2 330 447 A1 | 6/2011 |
| JP | 2-301701 | 12/1990 |
| JP | 2006-154421 A | 6/2006 |
| JP | 2007-179058 A | 7/2007 |
| JP | 2008-525309 A | 7/2008 |
| JP | 2010-503018 | 1/2010 |
| JP | 2010-530085 A | 9/2010 |
| JP | 2011-107672 A | 6/2011 |
| JP | 2011-523721 A | 8/2011 |
| JP | 2011-191782 A | 9/2011 |
| KR | 10-2009-0116651 | 11/2009 |
| KR | 10-2010-0071901 | 6/2010 |
| WO | WO 2011/108639 A1 | 9/2011 |

OTHER PUBLICATIONS

Extended European Search report issued Jan. 18, 2013 in counterpart European Patent Application No. 12188821.8 (6 pages, in English).

Korean Notice of Allowance issued Mar. 7, 2013 in counterpart Korean Patent Application No. 10-2011-0105904 (5 pages, in Korean).

Chinese Office Action issued Feb. 7, 2014 in counterpart Chinese Application No. 201210428985.9. (10 pages, in Chinese, with complete English translation).

Japanese Office Action issued Jan. 7, 2014 in counterpart Japanese Application No. 2012-229632. (7 pages, in Japanese, with complete English Translation).

* cited by examiner

BEND INSENSITIVE FIBER

CROSS-REFERENCE TO RELATED APPLICATION(S)

This application claims the benefit under 35 USC §119(a) of Korean Patent Application No. 10-2011-0105904, filed on Oct. 17, 2011, in the Korean Intellectual Property Office, the entire disclosure of which is incorporated herein by reference for all purposes.

BACKGROUND

1. Field

The following description relates to an optical fiber, and more particularly, to an optical fiber that has an extremely low bending loss.

2. Description of Related Art

Fiber to the x (FTTx) is a collective term for various optical fiber delivery topologies that are categorized according to where the fiber terminates. Recently, along with continuous expanding of the Fiber to the x (FTTx) market, various countries are investing in infrastructure including FTTx. For example, due to the increase in the amount of use of wireless data by smart phones, the wide spread of Three-Dimensional (3D) TVs, the introduction of TV portable services, the growth of wireless Internet Fourth-Generation (4G), such as Long Term Evolution (LTE) and WiMAX, and the like, there has been a required increase in the capacity of an optical backbone network.

Efficient network installation and operation of the FTTx depend on environmental restraints of a cable spreading site. Accordingly, service operators and optical fiber providers are continuously attempting to overcome a bending loss that is generated by a physical force at the site, especially, in an extreme bending environment.

To prevent degradation from bending loss of a single-mode optical fiber, a Mode-Field Diameter (MFD) control technique, a depressed clad manufacturing technique, a low-index trench manufacturing technique, a manufacturing technique for a nano-size air hole having an isotropy ring structure in the clad, and the like, have been proposed. However, commercialized techniques capable of maintaining the compatibility of connection with existing single-mode optical fibers (ITU-T G.652.D) while a the same time satisfying optical characteristics and reliability specifications of the international standard ITU-T G.656.B3, are extremely limited.

In an attempt to satisfy the foregoing optical characteristics and reliability characteristics, a manufacturing technique has been commercialized which includes a low-index trench including a core, an inner layer, and a minimum-index trench layer. Because the low-index trench technique has a superior mechanical and environmental reliability with a solid glass structure and because it is suitable for mass production, the low-index trench manufacturing technique has attracted much attention as a method for implementing an extreme bend insensitive fiber. Recently, as bending characteristics required in the spreading site have become more severe, an effort has been made to reinforce the bending loss characteristics by forming a deep trench.

However, one difficulty with the low-index trench manufacturing technique is minimizing the bending loss while maintaining a short cutoff wavelength. The characteristics of the cutoff wavelength in the optical fiber are inversely proportional to the bending loss characteristics. Accordingly, a high-order mode becomes difficult to control as the bending characteristics are strengthened. For example, a high-order mode such as LP11 or higher, which guides waves in the optical fiber, is more concentrated due to an interfacial condition of a deep trench region, i.e., an index difference, such that the waves are guided across a long distance while the high-order mode characteristics are maintained.

To address the foregoing problems, control over doping concentrations of the core and the trench layer and the sizes of the core and the trench layer are performed which typically degrades the yield in the actual manufacturing process.

SUMMARY

In an aspect, there is provided an optical fiber including a core comprising a maximum refractive index difference $\Delta n1$ in the optical fiber, an inner layer comprising a refractive index difference $\Delta n2$ that is smaller than the maximum refractive index of the core and decreases in a direction away from the core, the inner layer being positioned outside the core, and a trench layer comprising an inner-circumference refractive index difference $\Delta n3$ that is smaller than the refractive index difference of the inner layer and an outer-circumference refractive index difference $\Delta n4$ that is a minimum refractive index difference in the optical fiber, the trench layer being positioned outside the inner layer, wherein a refractive index difference of the trench layer gradually decreases from an inner surface to an outer surface of the trench layer, a ratio ($\Delta n3/\Delta n4$) of the inner-circumference refractive index difference $\Delta n3$ to the outer-circumference refractive index difference $\Delta n4$ is larger than 0.6 and smaller than 1, a ratio (a+b)/b of a radius 'a' of the core and a thickness 'b' of the inner layer is 2.8 or less, and the optical fiber comprises a cutoff wavelength of 1260 nm or less, a bending loss $\alpha 1$ of 1.0 dB or less in bending by a radius of 10 mm or less at a wavelength of 1550 nm, and a ratio ($\alpha 2/\alpha 1$) of a bending loss $\alpha 2$ at 1625 nm to the bending loss $\alpha 1$ at 1550 nm being less than 2.7.

The maximum refractive index difference of the core is less than 0.48$\Delta$% and the outer-circumference refractive index difference of the trench layer may be less than –0.21$\Delta$%.

The optical fiber may further comprise an outer layer that has a refractive index difference which is larger than the refractive index difference of the trench layer and smaller than the maximum refractive index of the core, the outer layer being positioned outside the trench layer.

The refractive index difference $\Delta n2$ of the inner layer may be in a range of –0.07$\Delta$% to 0.1$\Delta$%.

The radius of the core may be in a range of 3.0 μm to 7.0 μm.

The thickness of the inner layer may be in a range of 4.5 μm to 17.5 μm.

The ratio ($\alpha 2/\alpha 1$) of the bending loss $\alpha 2$ at 1625 nm to the bending loss $\alpha 1$ at 1550 nm may be 2.5 or less.

The optical fiber may have a zero-dispersion wavelength in a range of 1300 nm to 1324 nm and an inclination of the zero-dispersion wavelength is less than 0.092 ps/(nm$^2$·km).

The inner layer may comprise a first inner sub layer that has a refractive index difference which decreases in a direction away from the core, and a second inner sub layer that has a constant refractive index difference.

The trench layer may be formed by a modified chemical vapor deposition (MCVD) process, and the trench layer may be formed by depositing $SiO_2$ and an F-dopant on a substrate tube and increasing a flow rate of the F-dopant.

The trench layer may be formed by an outside vapor deposition process, and the trench layer may be formed by sequentially reducing a density of a soot forming the trench layer.

Other features and aspects may be apparent from the following detailed description, the drawings, and the claims.

Figure 1A:
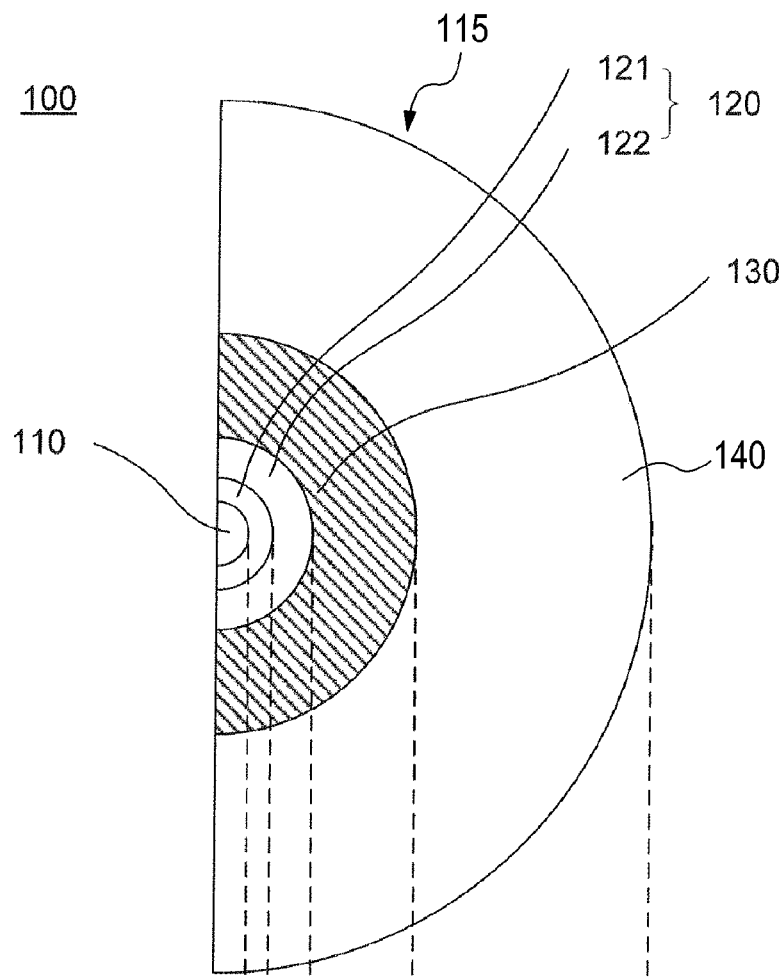
FIGS. 1A and 1B are diagrams illustrating examples of an optical fiber.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1B:
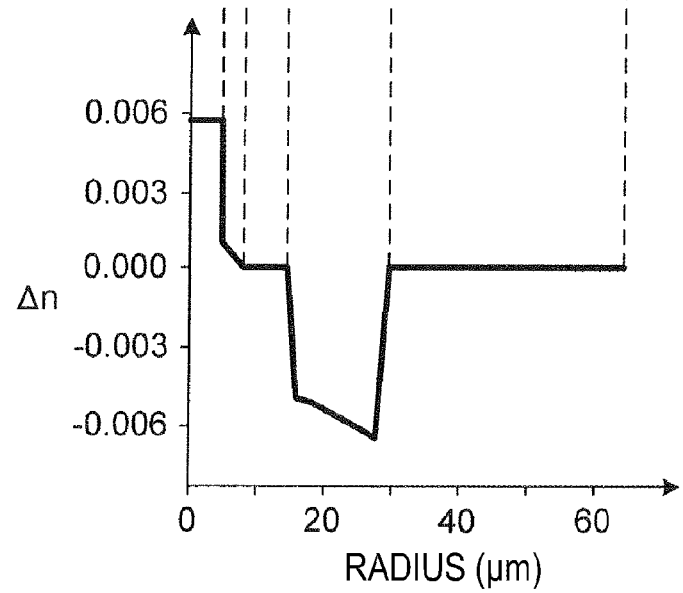
Figure 2:
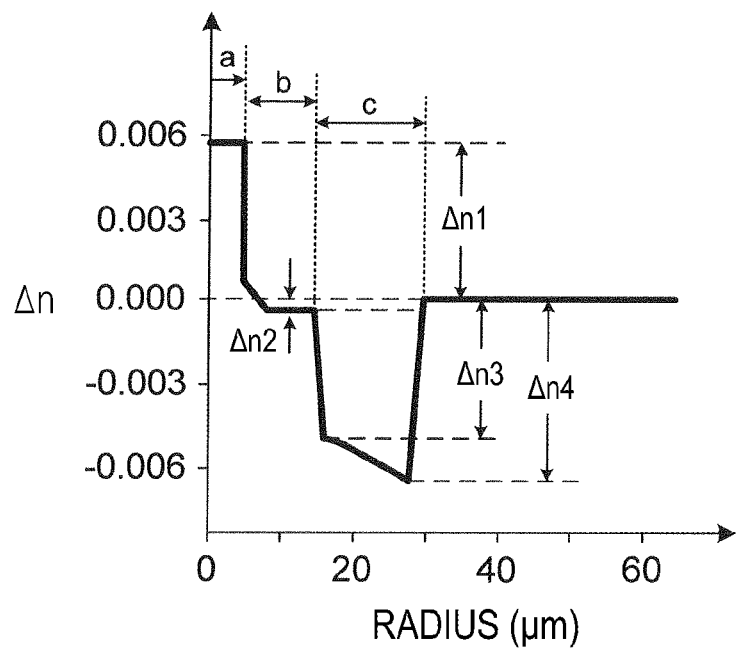
FIG. 2 is a diagram illustrating an example of a refractive-index difference profile.

FIGS. 1A and 1B illustrate examples of an optical fiber, and FIG. 2 illustrates an example of a refractive-index difference profile shown in the optical fiber of FIGS. 1A and 1B.

FIG. 1A shows a cross-section of an optical fiber 100 and FIG. 1B is a graph that illustrates an example of a refractive-index difference profile according to the cross-section of the optical fiber 100. Referring to FIGS. 1A and 1B, the optical fiber 100 includes a core 110 and a clad 115. The core 110 is positioned at the center of the optical fiber 100, has a relatively large refractive index difference, and may transmit an optical signal through total internal reflection. In this example, the clad 115 is positioned around an outside of the core 110 and has a relatively smaller refractive index difference. For example, the clad 115 may be positioned to completely enclose the core 110 along the outer circumference of the core 110. The core 110 is in a solid cylindrical shape, and the clad 115 is in a round tube shape, such that the core 110 and the clad 115 are positioned concentrically with respect to each other.

The core 110 has a maximum refractive index difference in the optical fiber 100. A refractive index difference $\Delta n1$ of the core 110 may be maintained constant over the entire region of the core 110. For example, a refractive-index difference $\Delta n1$ of the core 110 may be in a range of $0.24\Delta\%\sim0.48\Delta\%$ (where $\Delta\%$ may be expressed simply as %), and in particular, may be included in a range of $0.31\Delta\%$-$0.41\Delta\%$. As another example, a radius of the core 110 may be in a range of 3.0 μm~7.0 μm, and in particular, may be included in a range of 4.0 μm~5.0 μm. The radius of the core 110 may be measured at a position corresponding to ½ of the maximum refractive index difference of the core 110. For example, a refractive-index difference among layers of the optical fiber 100 may be defined as a difference between a refractive index of each layer and a refractive index of an outer layer 140 positioned outermost in the clad 115. Here, $\Delta\%$ indicates that a refractive-index difference is expressed in percentage. The refractive index difference of the outer layer 140 is 0.

The clad 115 includes an inner layer 120, the outer layer 140, and a trench layer 130 positioned between the inner layer 120 and the outer layer 140. The inner layer 120 may have a refractive index difference $\Delta n2$ which gradually decreases in a direction away from the outer circumference of the core 110 to the edge of the optical fiber 100. The outer layer 140 may have a refractive index difference which is similar to the smallest refractive index difference of the inner layer 120. The trench layer 130 may have the smallest refractive index difference among the layers of the optical fiber 100. For example, the inner layer 120, the trench layer 130, and the outer layer 140 may be sequentially deposited on the outer circumferential surface of the core 110, have round tube shapes, and may be positioned concentrically with respect to the core 110.

The inner layer 120 includes first and second inner sub layers 121 and 122 which may be sequentially deposited on the outer circumferential surface of the core 110, have round tube shapes, and may be positioned concentrically with respect to the core 110.

The first inner sub layer 121 may have a refractive-index difference profile in which a refractive index difference gradually decreases in a direction from an inner circumference contacting the outer circumferential surface of the core 110 to an outer circumference of the first inner sub layer 121. For example, the inner-circumference refractive index difference of the first inner sub layer 121 may be smaller than the refractive index difference of the core 110 and may be larger than the refractive index difference of the outer layer 140. The outer-circumference refractive index difference of the first inner sub layer 121 may be equal to the refractive index difference of the outer layer 140. As an example, the first inner sub layer 121 may have a refractive-index difference distribution such that the refractive index difference linearly decreases in a direction from the inner circumference of the first inner sub layer 121 to the outer circumference thereof. The second inner sub layer 122 may have a constant refractive index difference which is equal to the outer-circumference refractive index difference of the first inner sub layer 121.

For example, the refractive index difference $\Delta n2$ of the inner layer 120 may be included in a range of $-0.07\Delta\% \sim 0.1\Delta\%$. To minimize an optical loss caused by bending and obtain a maximum or improved Mode Field Diameter (MFD), the refractive-index difference of the inner layer 120 may be included in a range of $-0.07\Delta\% \sim 0.02\Delta\%$. The range of the inner layer 120 may be defined as a region from a position corresponding to a refractive-index difference of $0.05\Delta\%$ to a position corresponding to a refractive-index difference of $-0.05\Delta\%$ in a direction from the core 110 to the outer circumference.

A thickness b of the inner layer 120 from a position contacting the core 110 may be 4.5 μm to 17.5 μm. Herein, a ratio (a+b)/b of the radius a of the core 110 and the thickness b of the inner layer 120 may be 2.8 or less, and in particular, may be less than 2.7.

The trench layer 130 may be deposited on the outer circumferential surface of the inner layer 120, have a round tube shape, and may be positioned concentrically with respect to the core 110 and the inner layer 120. The trench layer 130 may have a refractive-index difference distribution such that the refractive index difference linearly decreases in a direction from the inner circumference of the trench layer 130 to the outer circumference thereof.

The outer-circumference refractive index difference of the trench layer 130 may correspond to the minimum refractive index difference of the optical fiber 100, and the trench layer 130 may have a refractive-index difference profile in which the refractive index difference gradually decreases in a direction from the inner circumference of the trench layer 130 to the outer circumference thereof.

The outer layer 140 encloses the trench layer 130 and may have a refractive index, for example, of 1.456 which is approximately equal to a refractive index of general pure silica glass.

Figure 3:
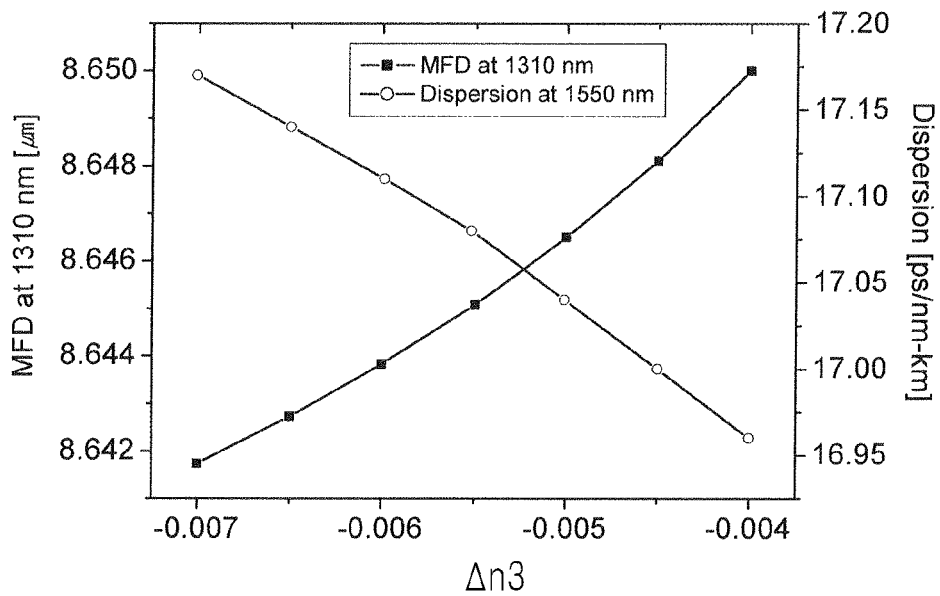
FIG. 3 is a diagram illustrating an example of a change of an MFD and a change of a dispersion value with respect to a change of an inner-circumferential refractive index difference of a trench layer.

FIG. 3 illustrates an example of a change of an MFD and a change of a dispersion value with respect to a change of an inner-circumferential refractive index difference of the trench layer 130. Referring to FIG. 3, the horizontal axis indicates an inner-circumference refractive index difference $\Delta n3$ of the trench layer 130, the left vertical axis indicates an MFD with respect to light of a wavelength 1310 nm, and the right vertical axis indicates a dispersion value. As the difference between an inner-circumferential refractive index difference $\Delta n3$ of the trench layer 130 and the minimum refractive index difference of the inner layer 120 decreases, the MFD increases and the dispersion value decreases. The increase of the MFD expands the distribution of light waves penetrating the trench layer 130, thereby lowering the valid refractive index difference of the core 110. A leaky mode is an example of a high-order mode of LP11. For example, by maintaining the inner-circumference refractive index difference $\Delta n3$ of the trench layer 130 to be as large as possible, a loss of the leaky mode may increase, thereby guaranteeing a single-mode condition of a use wavelength in a short distance.

Typically, when a general optical fiber is bent, a refractive index of a clad significantly changes. Due to such a change of the refractive index, a loss of light traveling in the optical fiber increases, such that long-distance transmission of the light is difficult or even impossible. For the long-distance transmission of light, a bending loss has to be reduced, and to this end, a change of the refractive index of the clad with respect to bending has to be reduced.

Figure 4:
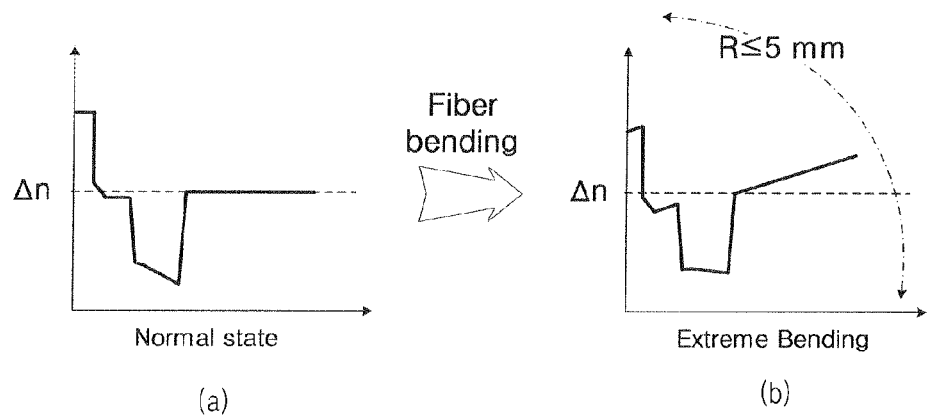
FIGS. 4A and 4B are diagrams illustrating examples of a change of a refractive-index difference profile in an optical fiber when the optical fiber is bent.

FIGS. 4A and 4B illustrate examples of a change of a refractive-index difference profile in the optical fiber 100 when the optical fiber 100 is bent. FIG. 4A illustrates an example of a refractive-index difference profile of the optical fiber 100 in a normal state, and FIG. 4B illustrates an example of a refractive-index difference profile of the optical fiber 100 when the optical fiber 100 is wound once around a cylinder having a radius of 5 mm or less.

Referring to FIGS. 4A and 4B, when the optical fiber 100 is bent, the refractive index of the clad significantly changes. In the normal state, the outer-circumference refractive index difference $\Delta n4$ of the trench layer 130 is smaller than the inner-circumference refractive index difference $\Delta n3$, such that the refractive-index difference distribution of the trench layer 130 becomes uniform in spite of bending of the optical fiber 100. That is, according to various aspects, when the optical fiber 100 is bent, the minimum refractive-index change in the trench layer 130 may be obtained. In addition, by making the outer-circumference refractive index difference $\Delta n4$ of the trench layer 130 smaller than the inner-circumference refractive index difference $\Delta n3$, a bending loss difference between a short wavelength and a long wavelength may be reduced by 2.5 times or less. Due to such improvement of wavelength dependency, utilization of long wavelengths can be facilitated in subscriber network operation. The optical fiber 100 may satisfy a relationship $\Delta n1 > \Delta n2 > \Delta n3 > \Delta n4$.

Figures 5A, 5B, 5C:
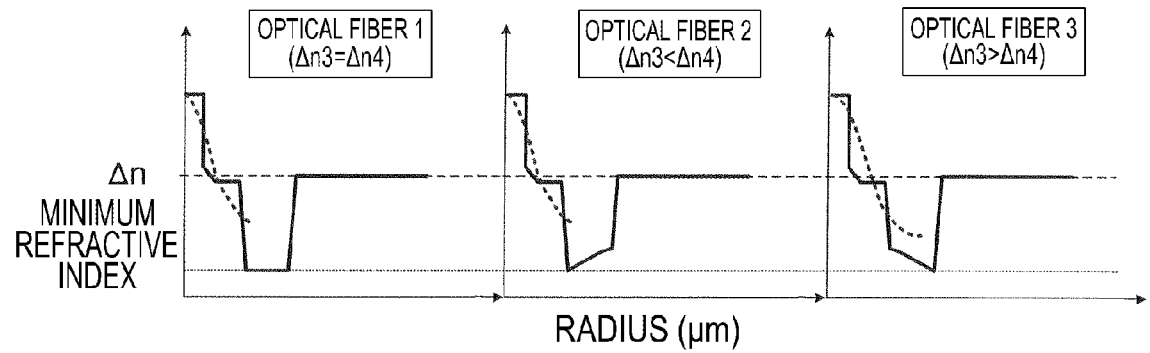
FIGS. 5A through 5C are diagrams illustrating examples of various refractive-index difference profiles of a trench layer.

FIGS. 5A through 5C illustrate examples of various refractive-index difference profiles of a trench layer. FIG. 5A illustrates an example of a refractive-index difference profile of a first optical fiber that has an inner-circumference refractive index difference $\Delta n3$ and an outer-circumference refractive index difference $\Delta n4$ which are equal to each other. FIG. 5B illustrates an example of a refractive-index difference profile of a second optical fiber that has an inner-circumference refractive index difference $\Delta n3$ and an outer-circumference refractive index difference $\Delta n4$, in which the inner-circumference refractive index difference $\Delta n3$ is smaller than the outer-circumference refractive index difference $\Delta n4$. FIG. 5C illustrates an example of a refractive-index difference profile of a third optical fiber that has an inner-circumference refractive index difference $\Delta n3$ and an outer-circumference refractive index difference $\Delta n4$, in which the inner-circumference refractive index difference $\Delta n3$ is larger than the outer-circumference refractive index difference $\Delta n4$.

Table 1 herein illustrates an example of the comparison of the optical fiber characteristics. In this example, the first optical fiber that has a condition of $\Delta n3 = \Delta n4$ maintains a large trench layer having a small refractive index difference, thus having a small bending loss and a small per-wavelength loss, but having a large cutoff wavelength due to high-order mode concentration. The second optical fiber that has a condition of $\Delta n3 < \Delta n4$ is weak to a bending loss due to a significant refractive index change of a clad. Meanwhile, the third optical fiber that has a condition of $\Delta n3 > \Delta n4$ has a small bending loss and a smaller cutoff wavelength due to high-order mode concentration.

TABLE 1

| Fiber Type | Δn3/Δn4 ratio | Bending loss [dB/turn] R = 2.5 mm | Bending loss [dB/turn] R = 5.0 mm | Bending loss ratio (1625/1550 nm) | Cutoff wavelength [λcc] | Remark |
|---|---|---|---|---|---|---|
| Fiber 1 | 1.01 | 0.45 | 0.05 | 2.01 | 1284.5 | Higher |
| (Δn3 = Δn4) | 1.00 | 0.47 | 0.06 | 2.15 | 1280.2 | cutoff |
| Fiber 2 | 1.32 | 0.76 | 0.103 | 2.78 | 1230.2 | Worst |
| (Δn3 < Δn4) | 1.24 | 0.71 | 0.099 | 2.73 | 1232.4 | bending |
| Fiber 3 | 0.87 | 0.49 | 0.04 | 2.28 | 1238.9 | good |
| (Δn3 > Δn4) | 0.84 | 0.43 | 0.04 | 2.25 | 1241.7 |  |

Figure 6:
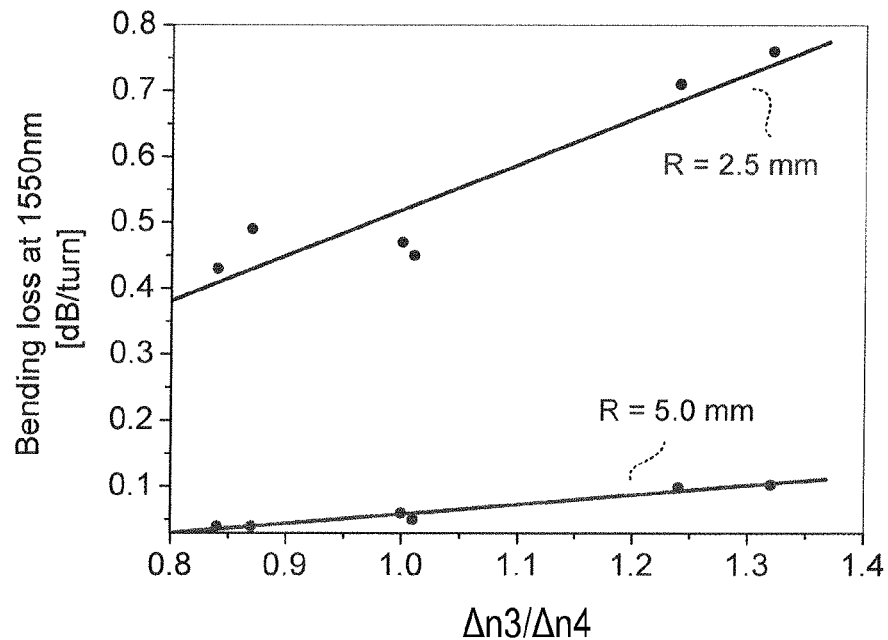
FIG. 6 is a diagram illustrating an example of a change of a bending loss with respect to a ratio ($\Delta n3/\Delta n4$) of an inner-circumferential refractive index difference $\Delta n3$ to an outer-circumferential refractive index difference $\Delta n4$ of a trench layer in a third optical fiber.

FIG. 6 illustrates an example of a change of a bending loss with respect to a ratio (n3/n4) of the inner-circumferential refractive index difference Δn3 to the outer-circumferential refractive index difference Δn4 of a trench layer in the third optical fiber. Referring to FIG. 6, the horizontal axis indicates a ratio (Δn3/Δn4) of the inner-circumferential refractive index difference Δn3 to the outer-circumferential refractive index difference Δn4, and the vertical axis indicates a bending loss with respect to light of a wavelength of 1550 nm. Shown in FIG. 6 are a bending loss curve when the third optical fiber is wound around a cylinder that has a radius of 5.0 mm and a bending loss curve when the third optical fiber is wound around a cylinder that a radius of 2.5 mm. In this example, as the ratio (Δn3/Δn4) of the inner-circumferential refractive index difference Δn3 to the outer-circumferential refractive index difference Δn4 decreases, a loss caused by bending of the optical fiber also decreases.

Figure 7:
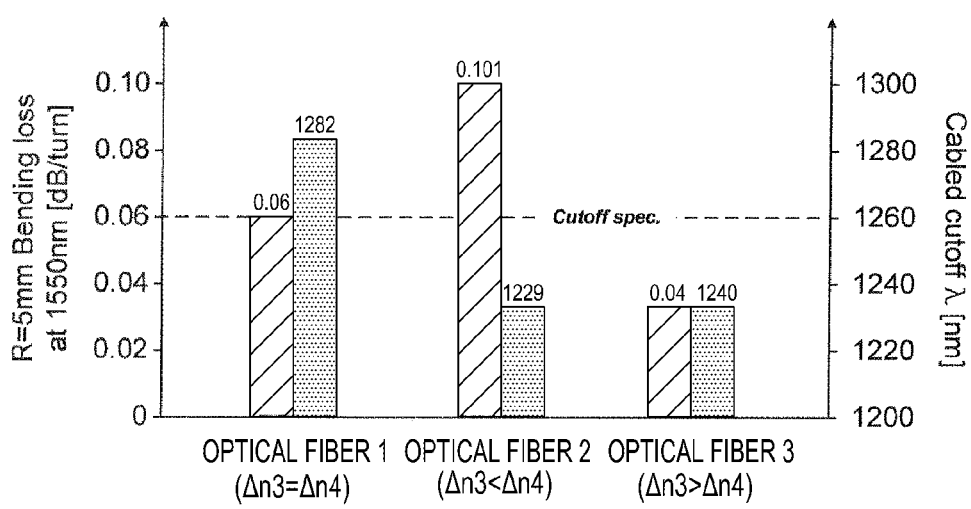
FIG. 7 is a diagram illustrating an example of bending losses and cutoff wavelengths for first through third optical fibers.

FIG. 7 illustrates an example of bending losses and cutoff wavelengths for the first through third optical fibers. Referring to FIG. 7, the left vertical axis indicates a bending loss with respect to the light of a wavelength of 1550 nm when the optical fiber is wound around the cylinder that has a radius of 5.0 mm, and the right vertical axis indicates a cutoff wavelength of the coated optical fiber. The third optical fiber has a refractive-index difference profile in which the inner-circumference refractive index difference Δn3 is larger than the outer-circumference refractive index difference Δn4, the third optical fiber has a smaller bending loss than the first optical fiber and the second optical fiber, and the third optical fiber has a shorter cutoff wavelength than the first optical fiber.

According to various aspects, the outer-circumference refractive-index difference Δn4 of the trench layer 130 may be preferably less than −0.21Δ%, and in particular, may be less than −0.27Δ%. For example, the ratio (Δn3/Δn4) of the inner-circumferential refractive index difference Δn3 to the outer-circumferential refractive index difference Δn4 may be larger than 0.6 and less than 1, and in particular, may be included in a range of 0.8~0.98.

A thickness c of the trench layer 130 may be less than 9.6 μm, and in particular, may be less than 7.2 μm.

Table 2 and Table 3 illustrate characteristics of a core material for an optical fiber. According to various aspects, the trench layer may be implemented by various deposition methods, for example, a Modified Chemical Vapor Deposition (MCVD) method for depositing $SiO_2$, which is a basic material, and a dopant for controlling a refractive index inside a substrate tube while rotating the tube around a central axis thereof, an outside vapor deposition method, and the like. Manufacturing processes of the core basic material are based on the substrate tube having a size of φ31 (inner diameter)× φ36 (outer diameter)×l1200 (length)[mm].

Table 2 illustrates a core of basic material that uses $CF_4$ or $SiF_4$ as a refractive-index control material.

TABLE 2

| Step Unit [SCCM] | Pass | $SiCl_4$ | $GeCl_4$ | $POCl_3$ | $CF_4$ or $SiF_4$ | He | $O_2$ | $Cl_2$ |
|---|---|---|---|---|---|---|---|---|
| Polishing | 2 | 0 | 0 | 0 | 20 | 3000 | 2000 | 0 |
| Outer Layer | 5 | 860 | 220 | 28 | 10 | 3000 | 350 | 0 |
| Trench Layer | 12 | 860 | 0 | 36 + 0.54/p | 110 | 3000 | 350 | 0 |
| Sintering | 1 | 0 | 0 | 0 | 0 | 3000 | 500 | 400 |
| Inner Layer | 8 | 860 − 15/p | 120 + 4.3/p | 28 | 0 | 3000 | 350 | 0 |
| Core | 14 | 210 − 5/p | 450 − 8.9/p | 0 | 0 | 1000 | 500 | 0 |
| Sintering | 5 | 0 | 0 | 0 | 0 | 3000 | 500 | 400 |
| Collapse | 10 | 0 | 0 | 0 | 0 | 0 | 420 | 350 |
| Close | 1 | 0 | 0 | 0 | 0 | 0 | 0 | 300 |

Table 3 illustrates a core of basic material that uses $BCl_3$ as a refractive-index control material.

TABLE 3

| Step Unit [SCCM] | Pass | $SiCl_4$ | $GeCl_4$ | $POCl_3$ | $BCl_3$ | He | $O_2$ | $Cl_2$ |
|---|---|---|---|---|---|---|---|---|
| Polishing | 2 | 0 | 0 | 0 | 20 | 3000 | 2000 | 0 |
| Outer Layer | 5 | 860 | 220 | 28 | 10 | 3000 | 350 | 0 |
| Trench Layer | 12 | 860 | 0 | 28 + 0.54/p | 100 | 3000 | 350 | 0 |
| Sintering | 1 | 0 | 0 | 0 | 0 | 3000 | 500 | 400 |
| Inner Layer | 8 | 860 − 15/p | 180 + 4.3/p | 28 | 25 | 3000 | 350 | 0 |
| Core | 14 | 210 − 5/p | 450 − 8.9/p | 0 | 0 | 1000 | 500 | 0 |
| Sintering | 5 | 0 | 0 | 0 | 0 | 3000 | 500 | 400 |
| Collapse | 10 | 0 | 0 | 0 | 0 | 0 | 420 | 350 |
| Close | 1 | 0 | 0 | 0 | 0 | 0 | 0 | 300 |

Figure 8:
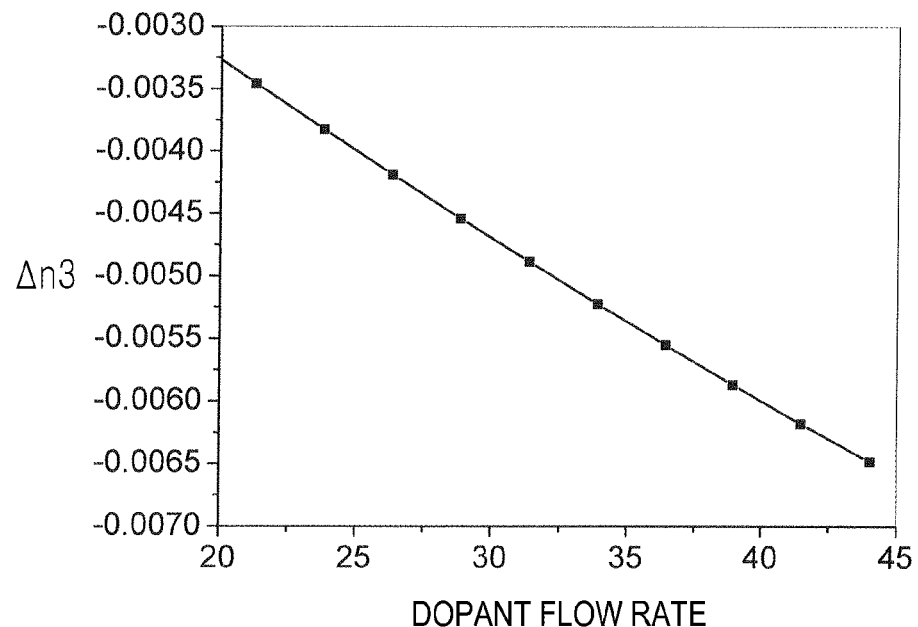
FIG. 8 is a diagram illustrating an example of a change of an inner-circumferential refractive index difference $\Delta n3$ of a trench layer with respect to a flow rate of a dopant including F such as $CF_4$ or $SiF_4$ in a process of manufacturing a core basic material according to a Modified Chemical Vapor Deposition (MCVD) method.

FIG. 8 illustrates an example of a change of the inner-circumferential refractive index difference Δn3 of the trench layer with respect to a flow rate of a dopant including F such as $CF_4$ or $SiF_4$ which is manufacture according to an MCVD method. Referring to FIG. 8, the trench layer may have a refractive-index difference distribution in which a refractive index difference decreases by increasing the flow rate of the F-dopant in the MCVD method.

In the outside vapor deposition method, which is another example for implementing the trench layer, the soot density can be controlled in the following manner. First, a soot forming the trench layer may be deposited by the outside vapor deposition method on a glass basic material in which a core and an inner layer have been manufactured by the MCVD and Vapor Phase Axial Deposition (VAD) methods. For example, when the soot is attached to the glass basic material several tens of times by a hydrolysis reaction through the outside vapor deposition method, the soot density may be sequentially reduced from the inner circumference of the trench layer to the outer circumference thereof.

Figure 9:
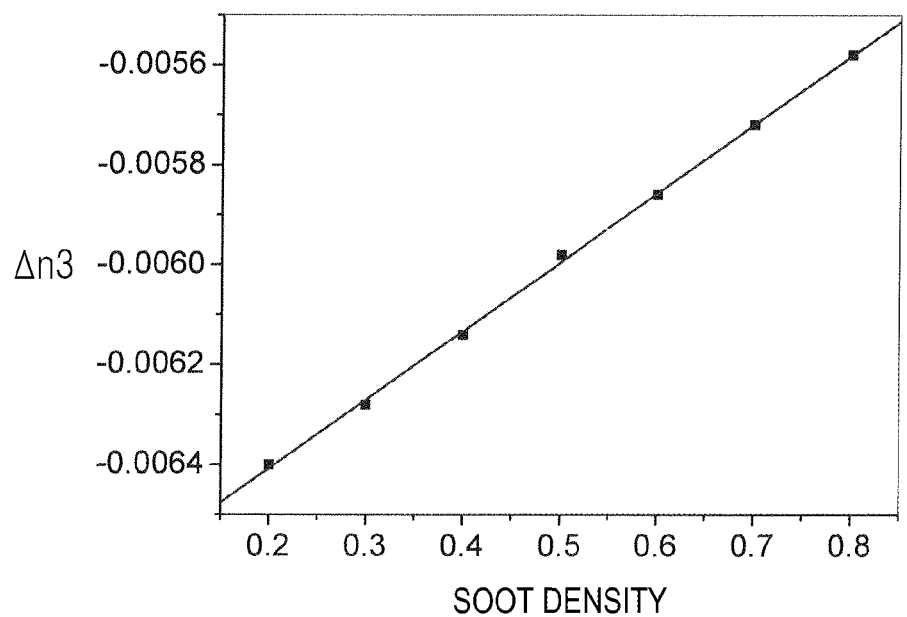
FIG. 9 is a diagram illustrating an example of a change of an inner-circumferential refractive index difference $\Delta n3$ of a trench layer with respect to a soot density in a process of manufacturing a core basic material according to an outside vapor deposition method.

FIG. 9 illustrates an example of a change of the inner-circumferential refractive index difference $\Delta n3$ of the trench layer with respect to the soot density in a core of basic material which is manufactured according to the outside vapor deposition method. As is illustrated, the doping density of the F-dopant is in proportion to the soot density, and thus the refractive-index difference distribution of the trench layer may be easily controlled by adjustment of the soot density. The soot is a porous layer and may be vitrificated by sintering and vitrification. For example, the vitrification may be implemented by heating the soot to 1500° C. for about 300 minutes in an atmosphere of $Cl_2$ of 1.0 slpm, He of 20 slpm, and the F-dopant ($CF_4$, $SiF_4$, etc.) of about 1~5 slpm. The sintering may be performed at a temperature of 1550~1650° C. and under vacuum of 1×10−2 torr. The sintering may be performed in an atmosphere of He of 15~20 slpm.

The core of basic material manufactured by the two examples above, may undergo an over-cladding process for depositing the soot on an outer circumference of the core of basic material using a deposition torch in which a raw material and a combustion gas are provided. Once the overclad soot is deposited on the core of basic material with constant outer diameter and weight, deposition is terminated and the core of basic material is slowly cooled, after which sintering and vitrification may be performed. An overclad layer deposited, sintered, and sintered outside the core basic material may be replaced with an overjacket.

The optical fiber basic material completed through the foregoing vitrification may be withdrawn to the optical fiber from a draw tower.

The optical fiber according to various aspects has a cutoff wavelength of 1260 nm or less, a bending loss of 1.0 dB or less in bending by a radius of 10 mm or less at a wavelength of 1550 nm, and a ratio ($\alpha 2/\alpha 1$) of a bending loss $\alpha 2$ at 1625 nm to a bending loss $\alpha 1$ at 1550 nm, which is less than 2.7. The optical fiber may have a bending loss of 1.0 dB/turn or less in bending by a radius of 2.5 mm at a wavelength of 1550 nm. The optical fiber may include a zero-dispersion wavelength in a range of 1300 nm~1324 nm, and an inclination of the zero-dispersion wavelength is less than 0.092 ps/($nm^2 \cdot km$).

For example, the optical fiber according to various aspects may have an MFD (@1310 nm) of 8.7 μm, a zero-dispersion wavelength of 1312 nm, and a cable cutoff wavelength of 1240 nm.

For example, when the optical fiber is wound once around a cylinder having a radius of 5 mm, an optical loss at 1550 nm is 0.04 dB; when the optical fiber is wound once around a cylinder having a radius of 2.5 mm, an optical loss at 1550 nm is 0.43 dB; and a per-wavelength loss ratio with respect to 1625 nm is 2.2.

The optical fiber may pass a Multiple Dwelling Units (MDU) application test, which is the standard of VERIZON® COMMUNICATIONS INC., and a sum of loss changes with respect to 90° perpendicular bending with loads of 2 kg and 13.5 kg, 2 times of 10 mm-diameter bending, 30 times of application of a cable tacker (T-25), and high-temperature/low-temperature/aging is less than 0.4 dB. A fusion connection loss for evaluating compatibility with a conventional general single-mode optical fiber may be measured as about 0.08 dB@1310, 1550 nm. According to various aspects, the optical fiber may reduce installation cost and time of the indoor system of the FTTx and maintain the optimal transmission characteristics even in an extreme environment (connector insertion loss, cable inside bending, temperature characteristics, and the like.).

The optical fiber according to various aspects maintains a small difference between the outer-circumference refractive index difference of the inner layer and the inner-circumference refractive index difference of the trench layer, thus having a short cutoff wavelength. In addition, by having a large difference between the outer-circumference refractive index difference of the trench layer and the refractive index difference of the outer layer, the minimum bending characteristics can also be satisfied.

Moreover, the optical fiber according to various aspects may maintain the inner-circumference refractive index difference of the trench layer as large as possible, such that a loss of a leaky mode may increase, thereby guaranteeing a single-mode condition of a use wavelength in a short distance. At the same time, by maintaining the outer-circumference refractive index difference of the trench layer as small as possible, the optical loss caused by refractive-index change with respect to bending of the optical fiber may be minimized. In addition, by making the outer-circumference refractive index difference of the trench layer small, a bending loss difference between a short wavelength and a long wavelength may be reduced by 2.7 times or less, and through such improvement of wavelength dependency, utilization of long wavelengths may be facilitated in subscriber network operation.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical fiber comprising:
a core comprising a maximum refractive index difference $\Delta n1$ in the optical fiber;
an inner layer comprising a refractive index difference $\Delta n2$ that is smaller than the maximum refractive index of the core and decreases in a direction away from the core, the inner layer being positioned outside the core; and
a trench layer comprising an inner-circumference refractive index difference $\Delta n3$ that is smaller than the refractive index difference of the inner layer and an outer-circumference refractive index difference $\Delta n4$ that is a minimum refractive index difference in the optical fiber, the trench layer being positioned outside the inner layer,
wherein a refractive index difference of the trench layer gradually decreases from an inner surface to an outer surface of the trench layer, a ratio ($\Delta n3/\Delta n4$) of the inner-circumference refractive index difference $\Delta n3$ to the outer-circumference refractive index difference $\Delta n4$ is larger than 0.6 and smaller than 1, a ratio (a+b)/b of a radius 'a' of the core and a thickness 'b' of the inner layer is less than 2.8, and the optical fiber comprises a cutoff wavelength of 1260 nm or less, a bending loss $\alpha 1$ of 1.0 dB or less in bending by a radius of 10 mm or less at a wavelength of 1550 nm, and a ratio ($\alpha 2/\alpha 1$) of a bending loss $\alpha 2$ at 1625 nm to the bending loss $\alpha 1$ at 1550 nm being less than 2.7.

2. The optical fiber of claim 1, wherein the maximum refractive index difference of the core is less than 0.48$\Delta$% and the outer-circumference refractive index difference of the trench layer is less than −0.21$\Delta$%.

3. The optical fiber of claim 1, further comprising an outer layer that has a refractive index difference which is larger than the refractive index difference of the trench layer and smaller than the maximum refractive index of the core, the outer layer being positioned outside the trench layer.

4. The optical fiber of claim 1, wherein the refractive index difference $\Delta n2$ of the inner layer is in a range of $-0.07\Delta\%$ to $0.1\Delta\%$.

5. The optical fiber of claim 1, wherein the radius of the core is in a range of 3.0 μm to 7.0 μm.

6. The optical fiber of claim 1, wherein the thickness of the inner layer is in a range of 4.5 μm to 17.5 μm.

7. The optical fiber of claim 1, wherein the optical fiber has a bending loss of 1.0 dB/turn or less in bending by a radius of 2.5 mm at a wavelength of 1550 nm.

8. The optical fiber of claim 1, wherein the ratio ($\alpha2/\alpha1$) of the bending loss $\alpha2$ at 1625 nm to the bending loss $\alpha1$ at 1550 nm is 2.5 or less.

9. The optical fiber of claim 1, wherein the optical fiber has a zero-dispersion wavelength in a range of 1300 nm to 1324 nm and an inclination of the zero-dispersion wavelength is less than $0.092 \text{ ps}/(\text{nm}^2 \cdot \text{km})$.

10. The optical fiber of claim 1, wherein the inner layer comprises:
    a first inner sub layer that has a refractive index difference which decreases in a direction away from the core; and
    a second inner sub layer that has a constant refractive index difference.

11. The optical fiber of claim 1, wherein the trench layer is formed by a modified chemical vapor deposition (MCVD) process, and the trench layer is formed by depositing $SiO_2$ and an F-dopant on a substrate tube and increasing a flow rate of the F-dopant.

12. The optical fiber of claim 1, wherein the trench layer is formed by an outside vapor deposition process, and the trench layer is formed by sequentially reducing a density of a soot forming the trench layer.

* * * * *